(12) United States Patent
Suumäki et al.

(10) Patent No.: US 7,769,379 B2
(45) Date of Patent: Aug. 3, 2010

(54) UNLICENSED MOBILE ACCESS SUPPORT IN MOBILE NETWORKS OF THE THIRD GENERATION

(75) Inventors: Jan Suumäki, Tampere (FI); Bimal Shrestha, Tampere (FI); Matti Wallenius, Tampere (FI)

(73) Assignee: Nokia Corporation, Espoo (FI)

( * ) Notice: Subject to any disclaimer, the term of this patent is extended or adjusted under 35 U.S.C. 154(b) by 1282 days.

(21) Appl. No.: 11/288,341

(22) Filed: Nov. 29, 2005

(65) Prior Publication Data

US 2006/0286981 A1 Dec. 21, 2006

(30) Foreign Application Priority Data

Jun. 17, 2005 (EP) .................... 05013165

(51) Int. Cl.
*H04W 4/00* (2009.01)
(52) U.S. Cl. .............. 455/435.1; 455/41.2; 455/433; 455/436; 370/331; 370/338; 370/352; 370/401; 370/328
(58) Field of Classification Search .............. 455/435.1, 455/41.2, 445, 436, 552.1, 557; 370/331, 370/338, 352, 401
See application file for complete search history.

(56) References Cited

U.S. PATENT DOCUMENTS

| | | | | |
|---|---|---|---|---|
| 7,280,826 B2* | 10/2007 | Nylander et al. | ............ | 455/433 |
| 7,283,822 B2* | 10/2007 | Gallagher et al. | ............ | 455/436 |
| 7,471,953 B2* | 12/2008 | Ruutu et al. | ............. | 455/456.1 |
| 7,515,575 B1* | 4/2009 | Shi et al. | ............. | 370/338 |
| 7,522,907 B2* | 4/2009 | Lupper et al. | ............. | 455/411 |
| 7,542,455 B2* | 6/2009 | Grayson et al. | ............. | 370/338 |
| 7,565,145 B2* | 7/2009 | Gallagher et al. | ............. | 455/436 |
| 7,606,190 B2* | 10/2009 | Markovic et al. | ............. | 370/328 |
| 7,623,486 B2* | 11/2009 | Caldwell et al. | ............. | 370/328 |
| 2002/0193139 A1 | 12/2002 | Mildh et al. | | |
| 2004/0116120 A1 | 6/2004 | Gallagher et al. | | |
| 2005/0265279 A1* | 12/2005 | Markovic et al. | ............. | 370/328 |
| 2005/0272424 A1* | 12/2005 | Gallagher et al. | ............. | 455/435.1 |
| 2006/0142011 A1* | 6/2006 | Kallio | ............. | 455/445 |
| 2008/0076419 A1* | 3/2008 | Khetawat et al. | ............. | 455/435.1 |
| 2009/0296676 A1* | 12/2009 | O'Neil et al. | ............. | 370/338 |

FOREIGN PATENT DOCUMENTS

EP 1 207 708 A1 5/2002

OTHER PUBLICATIONS

3GPP TS 23.060 V6.8.0, "*3rd Generation Partnership Project; Technical Specification Group Services and System Aspects; General Packet Radio Service (GPRS); Service Description; Stage 2 (Release 6)*" Mar. 2005, pp. 1-212.

(Continued)

*Primary Examiner*—Sharad Rampuria
(74) *Attorney, Agent, or Firm*—Mintz, Levin, Cohn, Ferris, Glovsky and Popeo, P.C.

(57) ABSTRACT

A method and system provides support of unlicensed mobile access to a core network. A mobile terminal and a network controller also provides for unlicensed mobile access which are configured therefore.

29 Claims, 3 Drawing Sheets

OTHER PUBLICATIONS

3GPP TS 43.318 V2.0.0, "$3^{RD}$ Generation Partnership Project; Technical Specification Group GSM/EDGE Radio Access Network; Generic Access to the A/Gb Interface; Stage 2 (Release 6)", Jan. 2005, pp. 1-65.

3GPP TS 44.318 V6.0.0, "$3^{RD}$ Generation Partnership Project; Technical Specification Group GSM/EDGE Radio Access Network Generic Access (GA) to the A/G.6 interface; Mobile GA interface layer 3 specification (Release 6)", Apr. 2005, pp. 1-146.

UMA Architecture (Stage 2) R1.0.4, "*Unlicensed Mobile Access (UMA); Architecture (Stage 2)*", XP-002394548, May 2, 2005, pp. 1-87.

UMA Protocols (Stage 3) R1.0.3, "*Unlicensed Mobile Access (UMA); Protocols (Stag3)*", XP-002387160, Feb. 26, 2005, pp. 1-156.

* cited by examiner

UNLICENSED MOBILE ACCESS SUPPORT IN MOBILE NETWORKS OF THE THIRD GENERATION

BACKGROUND OF THE INVENTION

The present invention relates to a method and system providing support of unlicensed mobile access in a network of the third generation. The present invention also relates to a mobile terminal and a network controller for unlicensed mobile access which are configured therefor. Within the meaning of the present application, the term unlicensed mobile access includes non-cellular access.

RELATED BACKGROUND ART

Unlicensed Mobile Access (UMA) is a technology where e.g. a GSM (Global System for Mobile communications) radio access network (GERAN—GSM EDGE RAN; EDGE=Enhanced Data in GSM), i.e. an access network of the second generation (2G), is replaced with a wireless local area network (WLAN), bluetooth (BT) or a similar unlicensed technology. However, the core network part of the mobile network is still the same. For the user, the same services are available in UMA as in GSM. For an overview regarding UMA, reference is made to the Internet address www.umatechnology.org as available at the time of the present application. Typically, a phone has both UMA and GSM radio support, and depending on the preferences and the GSM/UMA coverage, either technology is used. One major benefit of using UMA is to save radio resources and to extend the coverage, for example in areas where the GSM coverage is limited.

In the UMA specifications such as "UMA architecture (Stage 2)" and "UMA protocols (stage 3)" (substantially corresponding to 3GPP specifications TS43.318 (UMA stage 2) and TS44.318 (UMA stage 3)), UMA is specified only for the GSM technology, but it is evident that similar support is needed also for third generation (3G) networks. However, these specifications do not describe how the interaction such as a handover between third generation radio access networks and an unlicensed mobile access network (UMAN) will be made.

Currently, it is described in change request documents to the above specifications, namely in "UMA stage 2 R1.0.3 Change Request about Registration from UTRAN Cell" and "UMA Stage 3 R1.0.3 Change Request about Registration from UTRAN Cell", how a handover between an unlicensed mobile access network (UMAN) and the UTRAN (Universal Mobile Telecommunication System (UMTS) Terrestrial Radio Access Network) can be effected. That is, currently, the UMAN is a part of GERAN (a sub-system or special mode thereof).

SUMMARY OF THE INVENTION

Therefore, it is an object of the present invention to overcome the shortcomings of the prior art. Specifically, a method and system providing support of unlicensed mobile access to a core network of the third generation are provided. In addition, also a mobile terminal and a network controller for unlicensed mobile access configured therefor are provided.

Accordingly, the present invention describes inter alia how unlicensed mobile access can be a part of a radio access network of the third generation, such as UTRAN, or a sub-system thereof.

According to the present invention some changes to the UMA specifications are described, which are needed for UMA support of third generation networks.

According to a first aspect of the present invention, there is provided a method selecting an interface for accessing a core network over an unlicensed mobile access network, wherein the method uses a mobile terminal and a network controller for unlicensed mobile access, the method comprising: sending a request message from the mobile terminal to the network controller for unlicensed mobile access, wherein the request message is configured to request the registration of radio resources for unlicensed mobile access; including an indication into the request message by the mobile terminal which interface mode the mobile terminal supports, wherein the interface mode is either using an Iu interface between the radio access network for unlicensed mobile access and the core network, or an Gb interface between the radio access network for unlicensed mobile access and the core network; selecting the interface mode by the network controller for unlicensed mobile access; sending an accept message from the network controller for unlicensed mobile access to the mobile terminal, wherein the accept message is configured to indicate the acceptance of the registration of radio resources for unlicensed mobile access; and including an indication into the accept message by the network controller for unlicensed mobile access, wherein it is indicated which interface mode has been selected.

An advantageous modification could be that the selecting step is based on the capabilities of the core network where the network controller for unlicensed mobile access is connected.

Another advantageous modification could be that the request message is a URR_REGISTER_REQUEST message according to Technical Specification "Unlicensed Mobile Access (UMA); Protocols (Stage 3)" and the support of an interface mode is indicated by a new value for the UMA classmark parameter; and the accept message is a URR_REGISTER_ACCEPT message according to Technical Specification "Unlicensed Mobile Access (UMA); Protocols (Stage 3)" and the selection of an interface mode is indicated by a new field for the UMA control channel description parameter or by a completely new parameter.

Furthermore, the method according to a first aspect of the present invention can further comprise changing the interface mode by using a first update message from the mobile terminal to the network controller for unlicensed mobile access and a second update message from the network controller for unlicensed mobile access to the mobile terminal. In detail, the first update message may be a URR_REGISTER_UPDATE_UPLINK message according to Technical Specification "Unlicensed Mobile Access (UMA); Protocols (Stage 3)"; and the second update message may be a URR_REGISTER_UPDATE_DOWNLINK message according to Technical Specification "Unlicensed Mobile Access (UMA); Protocols (Stage 3)".

According to a second aspect of the present invention, there is provided a method selecting an interface for connecting a core network over an unlicensed mobile access network, wherein the method uses a mobile terminal and a network controller for unlicensed mobile access, the method comprising: sending a first request message from the mobile terminal to the network controller for unlicensed mobile access, wherein the first request message is configured to request the registration of radio resources for unlicensed mobile access; sending an accept message from the network controller for unlicensed mobile access to the mobile terminal, wherein the accept message is configured to indicate the acceptance of the registration of radio resources for unlicensed mobile access;

including an indication into the accept message by the network controller for unlicensed mobile access which interface mode the core network supports, wherein the interface mode is either using an Iu interface between a radio access network for unlicensed mobile access and the core network, or an Gb interface between a radio access network for unlicensed mobile access and the core network; selecting the interface mode by the mobile terminal; sending a second request message from the mobile terminal to the network controller for unlicensed mobile access, wherein the second request message is configured to request a connection based on radio resources for unlicensed mobile access; and including an indication into the second request message by the mobile terminal, wherein it is indicated which interface mode has been selected.

An advantageous modification of the method according to the second aspect could be that the first request message is a URR_REGISTER_REQUEST message according to Technical Specification "Unlicensed Mobile Access (UMA); Protocols (Stage 3)"; the accept message is a URR_REGISTER_ACCEPT message according to Technical Specification "Unlicensed Mobile Access (UMA); Protocols (Stage 3)" and the support of an interface mode is indicated by a new field for the UMA control channel description parameter or by a completely new parameter; and the second request message is a URR_REQUEST message according to Technical Specification "Unlicensed Mobile Access (UMA); Protocols (Stage 3)" and the selection of an interface mode is indicated by a new parameter.

According to the first aspect of the present invention, there is also provided a system configured to provide optimised access to a core network over an unlicensed mobile access network, the system comprising a mobile terminal and a network controller for unlicensed mobile access, wherein: the mobile terminal is configured to send a request message to the network controller for unlicensed mobile access, wherein the request message is configured to request the registration of radio resources for unlicensed mobile access; the mobile terminal is configured to include an indication into the request message which interface mode the mobile terminal supports, wherein the interface mode is either using an Iu interface between a radio access network for unlicensed mobile access and the core network, or an Gb interface between the radio access network for unlicensed mobile access and the core network; the network controller for unlicensed mobile access is configured to select the interface mode; the network controller for unlicensed mobile access is configured to send an accept message to the mobile terminal, wherein the accept message is configured to indicate the acceptance of the registration of radio resources for unlicensed mobile access; and the network controller for unlicensed mobile access is configured to include an indication into the accept message by the network controller for unlicensed mobile access, wherein it is indicated which interface mode has been selected.

The network controller for unlicensed mobile access can be further configured to base the selection on the capabilities of the core network where the network controller for unlicensed mobile access is connected.

The configuration of the mobile terminal can include that the request message is a URR_REGISTER_REQUEST message according to Technical Specification "Unlicensed Mobile Access (UMA); Protocols (Stage 3)", wherein the support of an interface mode is indicated by a new value for the UMA classmark parameter; and the configuration of the network controller for unlicensed mobile access can include that the accept message is a URR_REGISTER_ACCEPT message according to Technical Specification "Unlicensed Mobile Access (UMA); Protocols (Stage 3)", wherein the selection of an interface mode is indicated by a new field for the UMA control channel description parameter or by a completely new parameter.

The system according to the first aspect can be further configured to change the interface mode, wherein the mobile terminal is further configured to send a first update message to the network controller for unlicensed mobile access, and the network controller for unlicensed mobile access is further configured to send a second update message to the mobile terminal. In this case, the configuration of the mobile terminal can include that the first update message is a URR_REGISTER_UPDATE_UPLINK message according to Technical Specification "Unlicensed Mobile Access (UMA); Protocols (Stage 3)"; and the configuration of the network controller for unlicensed mobile access can include that the second update message is a URR_REGISTER_UPDATE_DOWNLINK message according to Technical Specification "Unlicensed Mobile Access (UMA); Protocols (Stage 3)".

According to the second aspect of the present invention, there is also provided a system configured to provide optimised access to a core network over an unlicensed mobile access network, the system comprising a mobile terminal and a network controller for unlicensed mobile access, wherein: the mobile terminal is configured to send a first request message to the network controller for unlicensed mobile access, wherein the first request message is configured to request the registration of radio resources for unlicensed mobile access; the network controller for unlicensed mobile access is configured to send an accept message to the mobile terminal, wherein the accept message is configured to indicate the acceptance of the registration of radio resources for unlicensed mobile access; the network controller for unlicensed mobile access is configured to include an indication into the accept message which interface mode the core network supports, wherein the interface mode is either using an Iu interface between a radio access network for unlicensed mobile access and the core network, or an Gb interface between the radio access network for unlicensed mobile access and the core network; the mobile terminal is configured to select the interface mode; the mobile terminal is configured to send a second request message to the network controller for unlicensed mobile access, wherein the second request message is configured to request a connection based on radio resources for unlicensed mobile access; and the mobile terminal is configured to include an indication into the second request message, wherein it is indicated which interface mode has been selected.

Here, the configuration of the mobile terminal can include that the first request message is a URR_REGISTER_REQUEST message according to Technical Specification "Unlicensed Mobile Access (UMA); Protocols (Stage 3)"; the configuration of the network controller for unlicensed mobile access includes that the accept message is a URR_REGISTER_ACCEPT message according to Technical Specification "Unlicensed Mobile Access (UMA); Protocols (Stage 3)", wherein the support of an interface mode is indicated by a new field for the UMA control channel description parameter or by a completely new parameter; and the configuration of the mobile terminal includes that the second request message is a URR_REQUEST message according to Technical Specification "Unlicensed Mobile Access (UMA); Protocols (Stage 3)", wherein the selection of an interface mode is indicated by a new parameter.

According to the first aspect of the present invention, there is also provided a network controller for unlicensed mobile access configured to be operated in an unlicensed mobile access network and comprising both an Iu interface and a Gb interface to a core network, wherein the network controller for unlicensed mobile access is operable connected with a mobile terminal, and: configured to receive and process a request message from the mobile terminal, wherein the request message is configured to request the registration of radio resources for unlicensed mobile access, and to include an indication which interface mode the mobile terminal supports, wherein the interface mode is either using the Iu interface or the Gb interface; configured to select the interface mode; configured to send an accept message to the mobile terminal, wherein the accept message is configured to indicate the acceptance of the registration of radio resources for unlicensed mobile access; and configured to include an indication into the accept message by the network controller for unlicensed mobile access, wherein it is indicated which interface mode has been selected.

This network controller for unlicensed mobile access can be further configured to base the selection on the capabilities of the core network.

Further, the configuration can include that the accept message is a URR_REGISTER_ACCEPT message according to Technical Specification "Unlicensed Mobile Access (UMA); Protocols (Stage 3)", wherein the selection of an interface mode is indicated by a new field for the UMA control channel description parameter or by a completely new parameter.

Still further, the network controller for unlicensed mobile access can be further configured to send a second update message to the mobile terminal upon receiving a first update message from the mobile terminal requesting a change of the interface mode. In this case, the configuration can include that the second update message is a URR_REGISTER_UPDATE_DOWNLINK message according to Technical Specification "Unlicensed Mobile Access (UMA); Protocols (Stage 3)".

According to the second aspect of the present invention, there is also provided a network controller for unlicensed mobile access configured to be operated in an unlicensed mobile access network and comprising both an Iu interface and a Gb interface to a core network, wherein the network controller for unlicensed mobile access is operable connected with a mobile terminal, and: configured to receive and process a first request message from the mobile terminal, wherein the first request message is configured to request the registration of radio resources for unlicensed mobile access; configured to send an accept message to the mobile terminal, wherein the accept message is configured to indicate the acceptance of the registration of radio resources for unlicensed mobile access; configured to include an indication into the accept message which interface mode the core network supports, wherein the interface mode is either using the Iu interface or the Gb interface; and configured to receive and process a second request message from the mobile terminal, wherein the second request message is configured to request a connection based on radio resources for unlicensed mobile access, and to include an indication which interface mode has been selected by the mobile terminal.

In this network controller for unlicensed mobile access, the configuration can include that the accept message is a URR_REGISTER_ACCEPT message according to Technical Specification "Unlicensed Mobile Access (UMA); Protocols (Stage 3)", wherein the support of an interface mode is indicated by a new field for the UMA control channel description parameter or by a completely new parameter.

According to the first aspect of the present invention, there is also provided a mobile terminal configured for optimised unlicensed mobile access to a core network over an unlicensed mobile access network, wherein the mobile terminal is operable connected with a network controller for unlicensed mobile access, and: configured to send a request message to the network controller for unlicensed mobile access, wherein the request message is configured to request the registration of radio resources for unlicensed mobile access; configured to include an indication into the request message which interface mode the mobile terminal supports, wherein the interface mode is either using an Iu interface between the radio access network for unlicensed mobile access and the core network, or an Gb interface between the radio access network for unlicensed mobile access and the core network; and configured to receive and process an accept message, wherein the accept message is configured to indicate the acceptance of the registration of radio resources for unlicensed mobile access, and to include an indication which interface mode has been selected by the network controller for unlicensed mobile access.

In this mobile terminal, the configuration can include that the request message is a URR_REGISTER_REQUEST message according to Technical Specification "Unlicensed Mobile Access (UMA); Protocols (Stage 3)", wherein the support of an interface mode is indicated by a new value for the UMA classmark parameter.

Also, this mobile terminal can be further configured to send a first update message to the network controller for unlicensed mobile access requesting a change of the interface mode. In this case, the configuration can include that the first update message is a URR_REGISTER_UPDATE_UPLINK message according to Technical Specification "Unlicensed Mobile Access (UMA); Protocols (Stage 3)".

According to the second aspect of the present invention, there is also provided a mobile terminal configured for optimised unlicensed mobile access to a core network over an unlicensed mobile access network, wherein the mobile terminal is operable connected with a network controller for unlicensed mobile access, and: configured to send a first request message to the network controller for unlicensed mobile access, wherein the first request message is configured to request the registration of radio resources for unlicensed mobile access; configured to receive and process an accept message from the network controller for unlicensed mobile access, wherein the accept message is configured to indicate the acceptance of the registration of radio resources for unlicensed mobile access, and to include an indication which interface mode the core network supports, wherein the interface mode is either using an Iu interface between the radio access network for unlicensed mobile access and the core network, or an Gb interface between the radio access network for unlicensed mobile access and the core network; configured to select the interface mode; configured to send a second request message to the network controller for unlicensed mobile access, wherein the second request message is configured to request a connection based on radio resources for unlicensed mobile access; and configured to include an indication into the second request message, wherein it is indicated which interface mode has been selected.

In this mobile terminal, the configuration can include that the first request message is a URR_REGISTER_REQUEST message according to Technical Specification "Unlicensed Mobile Access (UMA); Protocols (Stage 3)"; and that the second request message is a URR_REQUEST message according to Technical Specification "Unlicensed Mobile Access (UMA); Protocols (Stage 3)", wherein the selection of an interface mode is indicated by a new parameter.

Apart from that, the mobile terminal according to the first aspect or the second aspect of the present invention can also be configured to operate in a mode for GSM EDGE radio access, in a mode for UMTS terrestrial radio access, as well as in a mode for unlicensed mobile access.

According to a third aspect of the present invention, there is also provided a method of selecting an interface for accessing a core network over an unlicensed mobile access network, wherein the method uses a mobile terminal and a network controller for unlicensed mobile access, and the network controller for unlicensed mobile access comprises both an Iu interface and a Gb interface with the core network, the method comprising: detecting the capabilities of the mobile terminal to support an access over the Iu interface or the Gb interface; detecting the capabilities of the core network to support access over the Iu interface or the Gb interface; selecting the Iu interface or the Gb interface for access to the core network.

The third aspect of the present invention also includes providing a system configured to provide access to a core network over an unlicensed mobile access network, wherein the system comprises a mobile terminal and a network controller for unlicensed mobile access, and the network controller for unlicensed mobile access comprises both an Iu interface and a Gb interface with the core network, the system being configured to: detect the capabilities of the mobile terminal to support an access over the Iu interface or the Gb interface; detect the capabilities of the core network to support access over the Iu interface or the Gb interface; and select the Iu interface or the Gb interface for access to the core network.

Further, the third aspect also includes providing a network controller configured to provide unlicensed mobile access to a core network for a mobile terminal and comprising both an Iu interface and a Gb interface to the core network, the network controller being further configured to detect the capabilities of the mobile terminal to support an access over the Iu interface or the Gb interface; detect the capabilities of the core network to support access over the Iu interface or the Gb interface; and select the Iu interface or the Gb interface for access to the core network.

Still further, the third aspect also includes providing a mobile terminal configured to have access to a core network over an unlicensed mobile radio access network having a network controller for unlicensed mobile access comprising both an Iu interface and a Gb interface to the core network, the mobile terminal being further configured to detect the capabilities of the core network to support access over the Iu interface or the Gb interface; and select the Iu interface or the Gb interface for access to the core network.

According to a fourth aspect of the present invention, there is provided a network controller configured to provide unlicensed mobile access to a core network for a mobile terminal and comprising both an Iu interface and a Gb interface to the core network.

According to a fifth aspect of the present invention, there is provided a method selecting an interface for accessing a core network over an unlicensed mobile access network, wherein the method uses a mobile terminal and a network controller for unlicensed mobile access, the method comprising: exchanging negotiation messages between the mobile terminal and the network controller for unlicensed mobile access, thereby registering radio resources for unlicensed mobile access of the mobile terminal; including an indication into the negotiation messages which interface mode is supported, wherein the interface mode refers to the available interfaces between the radio access network for unlicensed mobile access and the core network; deciding on the interface mode to be used; and including an indication into the negotiation messages, wherein it is indicated which interface mode has been decided to be used.

BRIEF DESCRIPTION OF THE DRAWINGS

In the following, further features, modifications and advantages of the present invention will be more readily understood by referring to preferred embodiments thereof which are to be taken in conjunction with the appended drawings, in which.

PREFERRED EMBODIMENTS OF THE PRESENT INVENTION

In the mobile networks according to the third generation, an interface mode using the new Iu interface instead of A/Gb interface between the radio network and the core network can be adopted (for a description of an A/Gb mode and an Iu mode, reference is made e.g. to "3GPP TS 23.060" which explains the service description (stage 2) of the General Packet Radio Service (GPRS)). This Iu mode requires some changes in subscribing mobile terminals MS (which term shall designate any mobile station capable of being connected to a radio access network over the radio interface) with respect to earlier implementations. In addition, the Iu mode also causes several changes for most network elements. Thus, also some changes for the unlicensed mobile access (UMA) are needed. In UMA, a network controller is called UNC (UMA Network Controller) and corresponds to the base station controller (BSC) of the second generation networks (2G) and the radio network controller (RNC) of the third generation networks (3G). Consequently, a support of the Iu-mode support also causes changes to the UNC.

Apparently, both the UMA network controller UNC and the mobile terminal MS shall know whether Iu or A/Gb mode will be used. This information should be exchanged between the UMA network controller UNC and the mobile terminal MS during the UMA registration procedure (the mobile terminal MS makes a logical connection to the UMA network controller UNC).

In the Iu mode, the SubNetwork Dependent Convergence Protocol (SNDCP) and Logical Link Control (LLC) layers are not used in a GPRS data transmission. Also, at the network side, some protocol differences are between the radio access network and the core network. Hence, further changes to the UMA network controller UNC are required.

Figure 3:
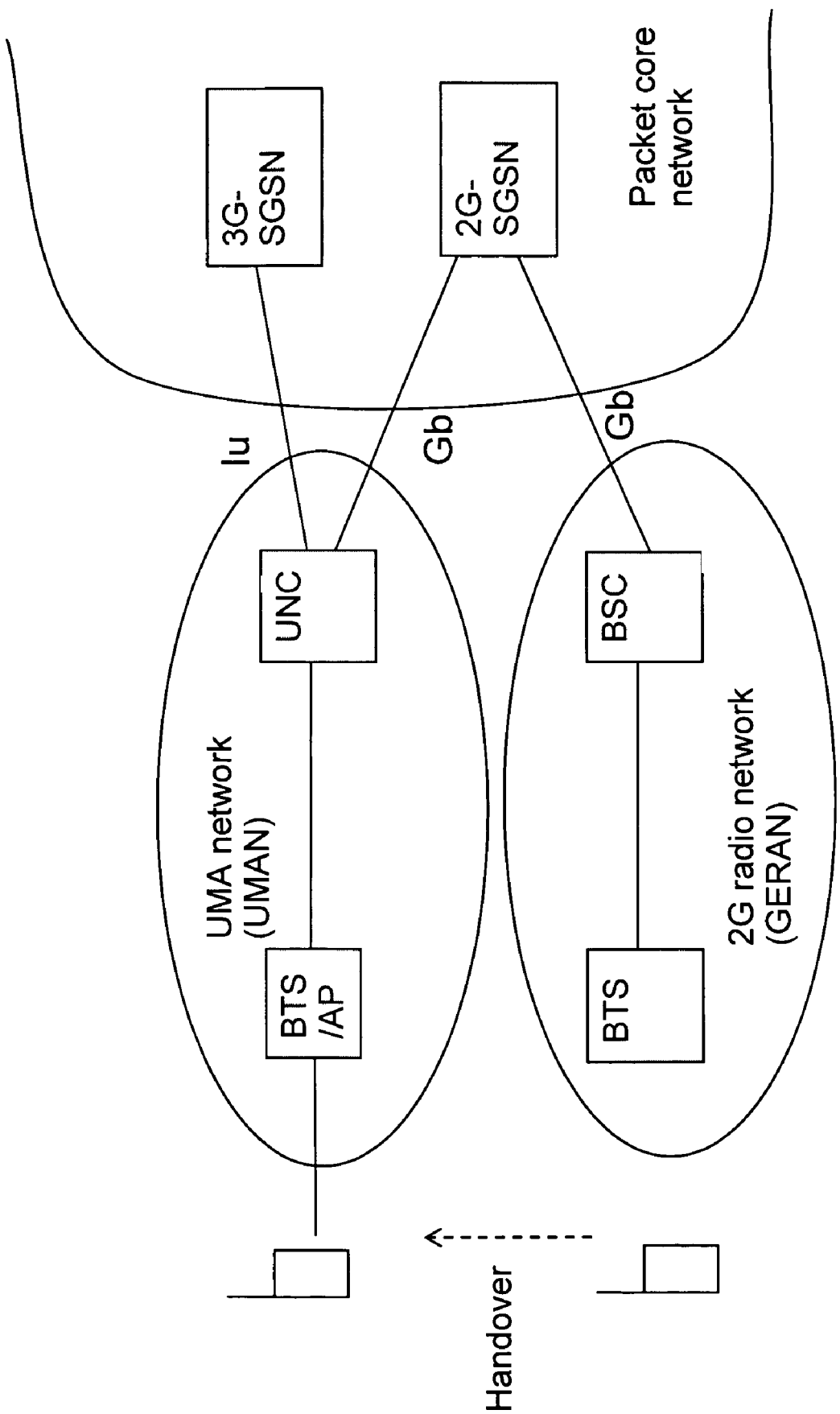
FIG. 3 shows a network controller for unlicensed mobile access according to another preferred embodiment of the present invention.
Figure 4:
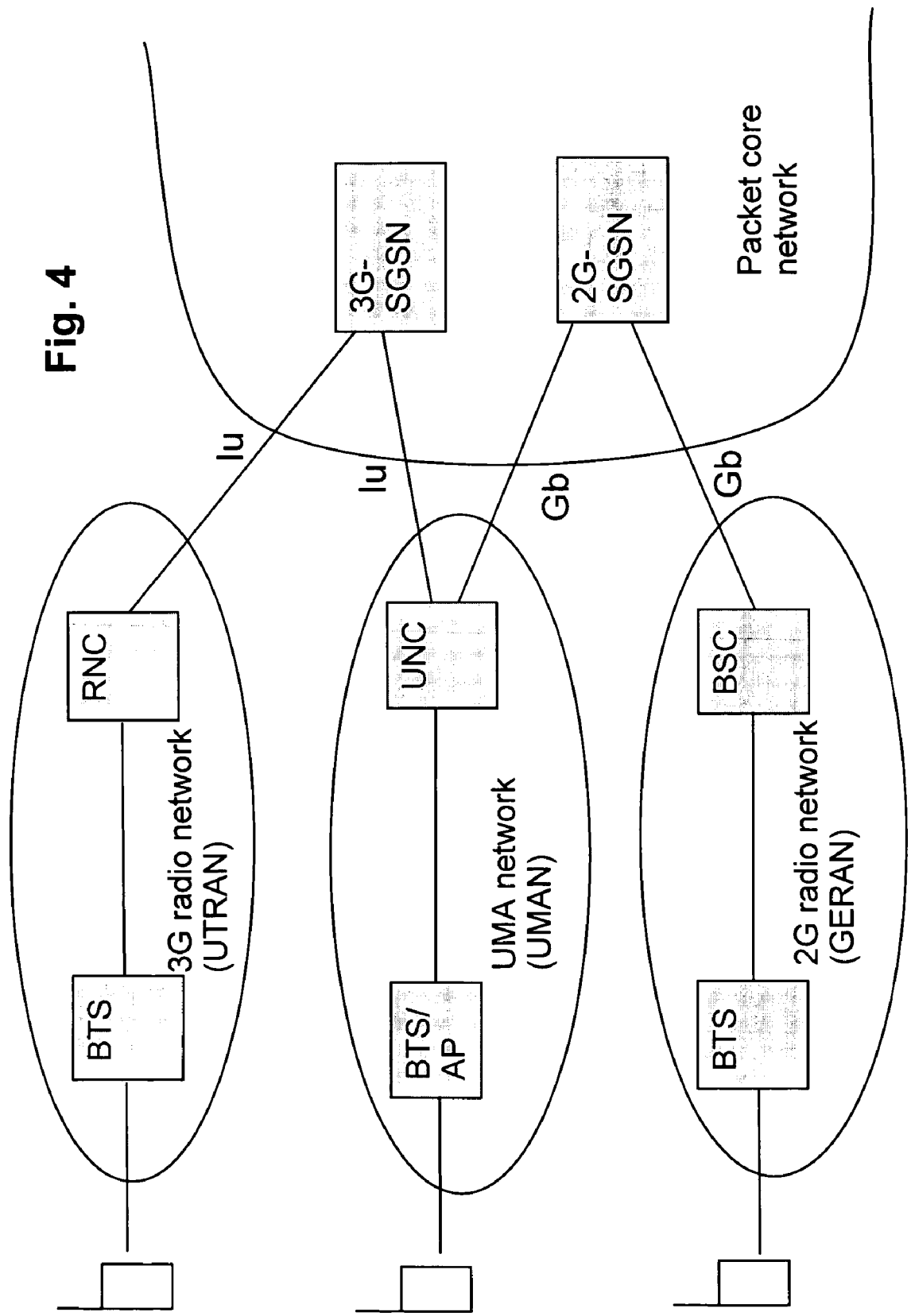
FIG. 4 shows a system configured to provide optimised access to a core network over an unlicensed mobile access network according to still another embodiment of the present invention.

A network controller for unlicensed mobile access comprises, as shown in FIGS. 3 and 4, both an Iu interface as well as a Gb interface to the core network, i.e. the same network controller is connected to a third generation serving node over the Iu mode and to a second generation serving node over the Gb mode. For an optimised packet switched communication, it would be preferable if the Iu mode is selected, if both the communicating mobile terminal and the concerned core network support the Iu mode.

Embodiment 1

Figure 1:
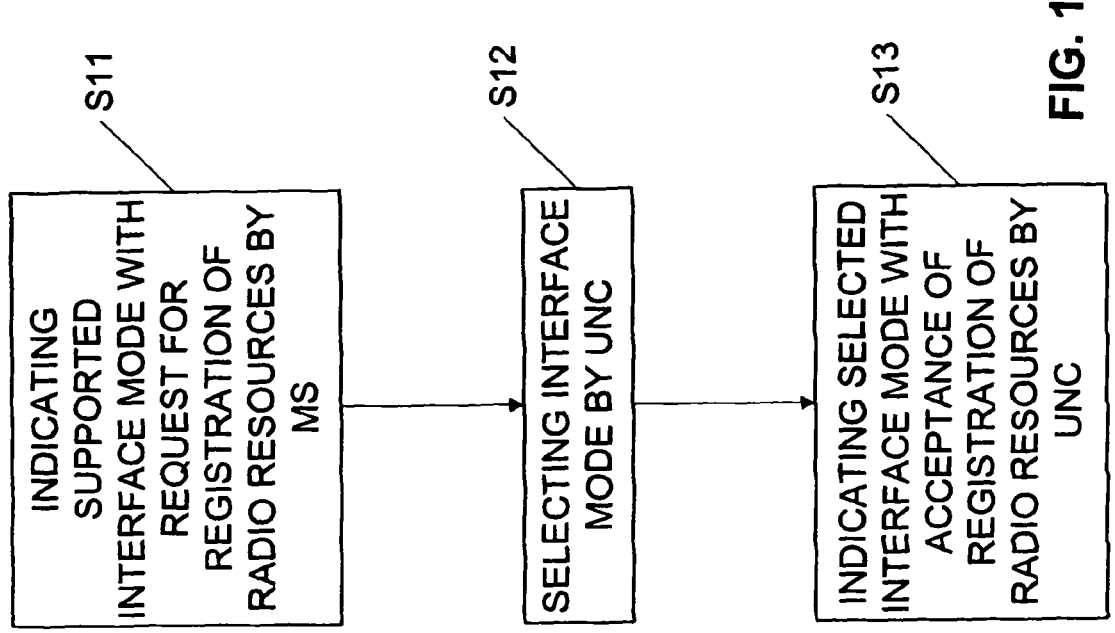
FIG. 1 shows a method according to a first preferred embodiment of the present invention.

FIG. 1 shows a first embodiment of the present invention. Specifically, what is shown is a method selecting an interface for accessing a core network over an unlicensed mobile access (UMA) network, wherein the method uses a mobile terminal (MS) and a network controller for unlicensed mobile access (UNC). The method comprises the following actions. At a step S11, a request message is sent from the mobile terminal (MS) to the network controller for unlicensed mobile access (UNC), wherein the request message is configured to request the registration of radio resources for unlicensed mobile access, and an indication is included into the request message by the mobile terminal (MS) which interface mode the mobile terminal (MS) supports, wherein the interface mode is either using an Iu interface between a radio access network for unlicensed mobile access and a core network, or an Gb interface between a radio access network for unlicensed mobile access and a core network. At a step S12, the interface mode is selected by the network controller for unlicensed mobile access (UNC). Eventually, at step S13, an accept message is sent from the network controller for unlicensed mobile access (UNC) to the mobile terminal (MS), wherein the accept message is configured to indicate the acceptance of the registration of radio resources for unlicensed mobile access (UMA), and an indication is included into the accept message by the network controller for unlicensed mobile access (UNC), wherein it is indicated which interface mode has been selected.

According to the first embodiment of the present invention, the mobile terminal MS can indicate the Iu-mode support in the URR_REGISTER_REQUEST message to the UMA network controller UNC (e.g. by creating a new value for the UMA Classmark parameter to indicate third generation support, see the above referred document "UMA protocols (stage 3)", Chapter 10.1.5 of version R1.0.0). Next, in the URR_REGISTER_ACCEPT message, the UMA network controller UNC will indicate whether the Iu-mode or the A/Gb-mode will be used in UMA (e.g. by creating a new field for the UMA control channel description parameter, see the above referred document "UMA protocols (stage 3)", Chapter 10.1.6 of version R1.0.0, or by creating a completely new parameter). The UMA network controller advantageously bases its selection on the capabilities of the core network to support the Iu mode.

Stated in other words, the mobile terminal MS will indicate the supported modes (Gb=GERAN or Iu=UTRAN) and the UMA network controller UNC will decide upon the actual used mode depending on the network capabilities.

When "roving-in" (an idle mode handover) or a usual handover to UMA (i.e. a dedicated mode handover) is made, as illustrated in FIG. 3, then the Gb or Iu-mode will be used depending on a negotiation during the UMA registration phase. During the UMA mode, the Iu and Gb mode could be changed by a URR_REGISTER_UPDATE_UPLINK message or a URR_REGISTER_UPDATE_DOWNLINK message if needed, in which cases new parameter may be needed.

Embodiment 2

Figure 2:
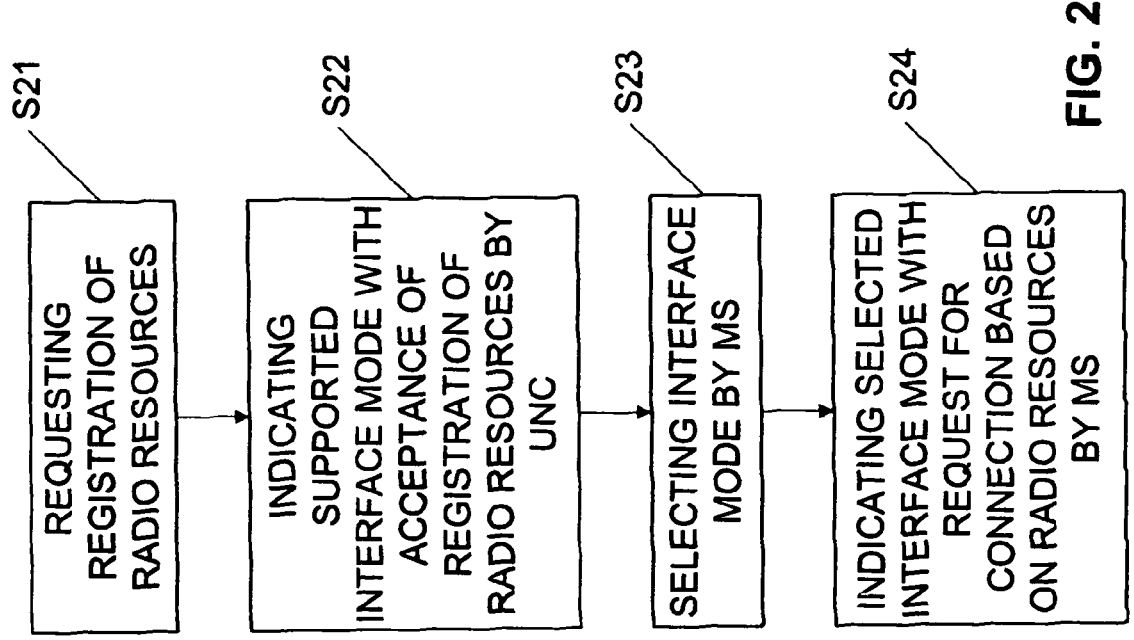
FIG. 2 shows a method according to a second preferred embodiment of the present invention.

FIG. 2 shows a second embodiment of the present invention. Specifically, depicted is a method selecting an interface for connecting a core network over an unlicensed mobile access (UMA) network, wherein the method uses a mobile terminal (MS) and a network controller for unlicensed mobile access (UNC). In detail, the method comprises a step S21 of sending a first request message from the mobile terminal (MS) to the network controller for unlicensed mobile access (UNC), wherein the first request message is configured to request the registration of radio resources for unlicensed mobile access (UMA). At a second step S22, an accept message is sent from the network controller for unlicensed mobile access (UNC) to the mobile terminal (MS), wherein the accept message is configured to indicate the acceptance of the registration of radio resources for unlicensed mobile access, and an indication is included into the accept message by the network controller for unlicensed mobile access (UNC) which interface mode the core network supports, wherein the interface mode is either using an Iu interface between a radio access network for unlicensed mobile access and a core network, or an Gb interface between a radio access network for unlicensed mobile access and a core network. Next, at step S23, the interface mode is selected by the mobile terminal MS. Finally, at step S24, a second request message is sent from the mobile terminal (MS) to the network controller for unlicensed mobile access (UNC), wherein the second request message is configured to request a connection based on the accepted radio resources for unlicensed mobile access, and an indication is included into the second request message by the mobile terminal (MS), wherein it is indicated which interface mode has been selected.

Regarding a particular implementation, other than in embodiment 1, the mobile terminal MS does not indicate support of the Iu mode in the message URR_REGISTER_REQUEST. Rather, the UMA network controller UNC indicates the supported modes in the message URR_REGISTER_ACCEPT, but a selection of an actually used mode is not made.

When the mobile terminal MS establishes a UMA radio resource (URR) connection towards the UMA network controller UNC, the selection of the Iu or Gb mode is made by the mobile terminal MS (e.g, by creating a new parameter to the message URR_REQUEST to indicate the mode). Also, in the UMA radio link control (URLC) transport channel activation the mode shall be selected by the mobile terminal MS (e.g. by creating a new parameter to URLC_ACTIVATE_UTC_REQ or ACK depending on whether the mobile terminal MS or the UMA network controller UNC will initiate a transport channel activation or complete new messages for the Iu mode transport channel activation, because several parameters of ULRC_ACTIVATE_UTC_* are second generation specific).

Other Embodiments

As shown in FIG. 3, a network controller according to another preferred embodiment of the present invention is configured to provide unlicensed mobile access to a core network for a mobile terminal and comprises both an Iu interface and a Gb interface to the core network. What is not depicted are the elements of a circuit switched core network such as an Iu interface of the network controller for unlicensed mobile access to a third generation mobile services switching centre (MSC), or an A interface of the network controller for unlicensed mobile access to a second generation mobile services switching centre (MSC).

With this basic structure of a network controller for unlicensed mobile access according to another preferred embodiment of the present invention, it is possible to perform a basic method according to still another preferred embodiment of the present invention. Such a basic method comprises the selection of an interface for accessing a core network over an unlicensed mobile access network, wherein the method uses a mobile terminal and a network controller for unlicensed mobile access, and the network controller for unlicensed mobile access comprises both an Iu interface and a Gb interface with the core network. This method further comprises the steps of detecting the capabilities of the mobile terminal to support an access over the Iu interface or the Gb interface; detecting the capabilities of the core network to support access over the Iu interface or the Gb interface; and selecting the Iu interface or the Gb interface for access to the core network.

A corresponding system is configured to provide access to a core network over an unlicensed mobile access network, wherein the system comprises a mobile terminal and a network controller for unlicensed mobile access, and the network controller for unlicensed mobile access comprises both an Iu interface and a Gb interface with the core network as e.g. shown in FIGS. 3 and 4. The system is further configured to detect the capabilities of the mobile terminal to support an access over the Iu interface or the Gb interface; detect the capabilities of the core network to support access over the Iu interface or the Gb interface; and select the Iu interface or the Gb interface for access to the core network.

FIGS. 3 and 4 also show a network controller according to a preferred embodiment of the present invention. This network controller is configured to provide unlicensed mobile access to a core network for a mobile terminal and comprising both an Iu interface and a Gb interface to the core network. Apart from that, this network controller is further configured to detect the capabilities of the mobile terminal to support an access over the Iu interface or the Gb interface; detect the capabilities of the core network to support access over the Iu interface or the Gb interface; and select the Iu interface or the Gb interface for access to the core network.

A mobile terminal as shown in FIGS. 3 and 4 is, according to a preferred embodiment of the present invention, configured to have access to a core network over an unlicensed mobile radio access network having a network controller for unlicensed mobile access comprising both an Iu interface and a Gb interface to the core network. The mobile terminal is further configured to detect the capabilities of the core network to support access over the Iu interface or the Gb interface; and select the Iu interface or the Gb interface for access to the core network.

Specifically, as shown in FIG. 4, a mobile terminal according to any of the preferred embodiments of the present invention is desirably and advantageously configured to operate in a mode for GSM EDGE radio access (with inter alia the elements base transceiver station BTS and base station controller BSC), in a mode for UMTS terrestrial radio access (with inter alia the elements base transceiver station BTS and radio network controller RNC), as well as in a mode for unlicensed mobile access (with the elements base transceiver station and/or bluetooth access point AP and WLAN access point AP, respectively, and network controller for unlicensed mobile access UNC). However, the above mentioned radio access networks are only listed as implementation examples for carrying out the present invention. Rather, the present invention is in no way intended to be limited thereto, and it is apparent to those skilled in the art that other radio access networks according to the second generation of mobile communication networks as well as according to the third generation of mobile communication networks are likewise preferred and advantageous. Thus, the present invention may be implemented with corresponding elements of the second and third generation of communication networks as apparent to those skilled in the art.

As the usage for unlicensed mobile access (UMA) is also conceivable in connection with code division multiple access (CDMA) technology, also the present invention can be applied thereto. Specifically, in this case it is to be considered which different types of interfaces to the core network the network controller for unlicensed mobile access (UMAN) supports. For example, the mobile terminal could indicate the supported interface types in a message requesting the registration of radio resources. Then, the network controller for unlicensed mobile access (UMAN) could select the most suitable interface type based on its own as well as on the core network capabilities and inform the used interface type in a message answering the mobile terminal's request. As discussed in connection with the above preferred embodiments, the method could also be conducted vice versa. On a general level, the present preferred embodiment is a method selecting an interface for accessing a core network over an unlicensed mobile access network, wherein the method uses a mobile terminal and a network controller for unlicensed mobile access, the method comprising: exchanging negotiation messages between the mobile terminal and the network controller for unlicensed mobile access, thereby registering radio resources for unlicensed mobile access of the mobile terminal; including an indication into the negotiation messages which interface mode is supported, wherein the interface mode refers to the available interfaces between the radio access network for unlicensed mobile access and the core network; deciding on the interface mode to be used; and including an indication into the negotiation messages, wherein it is indicated which interface mode has been decided to be used.

As for the criteria to be used in any of the above preferred embodiments of the present invention with respect to the actual decision which interface between the network controller for unlicensed mobile access and the core network shall be used, it is to be noted that they can be subscriber-based, i.e. that certain services the user has subscribed to are only provided over a certain interface. Further, it is possible to base the decision/selection on load aspects or technological aspects of the core network such as temporary problems. However, in the absence of an exceptional circumstances of the kind indicated above, the decision/selection could be based on a hardware policy such that e.g. in case of 2G/3G networks as inter alia described above, the Iu interface is always chosen in case its available. That is, the fastest and/or technically most advanced interface should usually be chosen if no other reasons prevail.

Accordingly, what is described above is a method and system providing support of unlicensed mobile access to a core network. Also described is a mobile terminal and a network controller for unlicensed mobile access which are configured therefor.

While it has been described above what is presently considered to be preferred embodiments of the present invention it is to be understood by those who are skilled in the art that various modifications thereof may be made without deviating from the spirit and scope of the present invention as defined by the appended claims.

The invention claimed is:

1. A method of selecting an interface for accessing a core network over an unlicensed mobile access network, wherein the method uses a mobile terminal and a network controller for unlicensed mobile access, the method comprising:
sending a request message from a mobile terminal to a network controller for unlicensed mobile access, wherein the request message is configured to request a registration of radio resources for unlicensed mobile access;
including an indication into the request message by the mobile terminal which interface mode the mobile terminal supports, wherein the interface mode is either using an Iu interface between a radio access network for unlicensed mobile access and a core network, or an Gb interface between the radio access network for unlicensed mobile access and the core network;

selecting the interface mode by the network controller for unlicensed mobile access;

sending an accept message from the network controller for unlicensed mobile access to the mobile terminal, wherein the accept message is configured to indicate an acceptance of the registration of radio resources for unlicensed mobile access; and including another indication into the accept message by the network controller for unlicensed mobile access, wherein the interface mode that has been selected is indicated.

2. The method according to claim 1, wherein the selecting step comprises selecting the interface mode based on capabilities of the core network where the network controller for unlicensed mobile access is connected.

3. The method according to claim 1, wherein
the request message comprises a URR_REGISTER_REQUEST message and support of the interface mode is indicated by a new value for an unlicensed mobile access (UMA)
classmark parameter; and
the accept message comprises a URR_REGISTER ACCEPT message and a selection of the interface mode is indicated by a new field for a UMA control channel description parameter or by a completely new parameter.

4. The method according to claim 1, further comprising changing the interface mode by using a first update message from the mobile terminal to the network controller for unlicensed mobile access and a second update message from the network controller for unlicensed mobile access to the mobile terminal.

5. The method according to claim 4, wherein
the first update message comprises a URR_REGISTER_UPDATE_UPLINK message; and
the second update message comprises a URR_REGISTER_UPDATE_DOWNLINK message.

6. A method of selecting an interface for connecting a core network over an unlicensed mobile access network, wherein the method uses a mobile terminal and a network controller for unlicensed mobile access, the method comprising:

sending a first request message from a mobile terminal to a network controller for unlicensed mobile access, wherein the first request message is configured to request a registration of radio resources for unlicensed mobile access;

sending an accept message from the network controller for unlicensed mobile access to the mobile terminal, wherein the accept message is configured to indicate an acceptance of the registration of radio resources for unlicensed mobile access;

including an indication into the accept message by the network controller for unlicensed mobile access which interface mode a core network supports, wherein the interface mode is either using an Iu interface between a radio access network for unlicensed mobile access and the core network, or an Gb interface between the radio access network for unlicensed mobile access and the core network;

selecting the interface mode by the mobile terminal;

sending a second request message from the mobile terminal to the network controller for unlicensed mobile access, wherein the second request message is configured to request a connection based on radio resources for unlicensed mobile access; and including another indication into the second request message by the mobile terminal, wherein the interface mode that has been selected is indicated.

7. The method according to claim 6, wherein
the first request message comprises a
URR_REGISTER_REQUEST message;
the accept message comprises a URR_REGISTER_ACCEPT message and support of the interface mode is indicated by a new field for a UMA control channel description parameter or by a completely new parameter; and
the second request message comprises a URR_REQUEST message and selection of the interface mode is indicated by a new parameter.

8. A system configured to provide optimized access to a core network over an unlicensed mobile access network, the system comprising:

a mobile terminal and a network controller for unlicensed mobile access, wherein
the mobile terminal is configured to send a request message to the network controller for unlicensed mobile access, wherein the request message is configured to request a registration of radio resources for unlicensed mobile access;
the mobile terminal is configured to include an indication into the request message which interface mode the mobile terminal supports, wherein the interface mode is either using an Iu interface between a radio access network for unlicensed mobile access and a core network, or an Gb interface between the radio access network for unlicensed mobile access and the core network;
the network controller for unlicensed mobile access is configured to select the interface mode;
the network controller for unlicensed mobile access is configured to send an accept message to the mobile terminal, wherein the accept message is configured to indicate an acceptance of the registration of radio resources for unlicensed mobile access; and
the network controller for unlicensed mobile access is configured to include another indication into the accept message by the network controller for unlicensed mobile access, wherein the interface mode that has been selected is indicated.

9. The system according to claim 8, wherein the network controller for unlicensed mobile access is further configured to base a selection on capabilities of the core network where the network controller for unlicensed mobile access is connected.

10. The system according to claim 8, wherein
the configuration of the mobile terminal includes that the request message comprises a URR_REGISTER_REQUEST message, wherein support of the interface mode is indicated by a new value for a UMA classmark parameter; and
the configuration of the network controller for unlicensed mobile access includes that the accept message comprises a URR_REGISTER_ACCEPT message, wherein selection of the interface mode is indicated by a new field for a UMA control channel description parameter or by a completely new parameter.

11. The system according to claim 8, further configured to change the interface mode, wherein the mobile terminal is further configured to send a first update message to the network controller for unlicensed mobile access, and the network controller for unlicensed mobile access is further configured to send a second update message to the mobile terminal.

12. The system according to claim 11, wherein
the configuration of the mobile terminal includes that the first update message comprises a URR_REGISTER_UPDATE_UPLINK message; and
the configuration of the network controller for unlicensed mobile access includes that the second update message comprises a URR_REGISTER_UPDATE_DOWNLINK message.

13. A system configured to provide optimized access to a core network over an unlicensed mobile access network, the system comprising:
a mobile terminal and a network controller for unlicensed mobile access, wherein
the mobile terminal is configured to send a first request message to the network controller for unlicensed mobile access, wherein the first request message is configured to request a registration of radio resources for unlicensed mobile access;
the network controller for unlicensed mobile access is configured to send an accept message to the mobile terminal, wherein the accept message is configured to indicate an acceptance of the registration of radio resources for unlicensed mobile access;
the network controller for unlicensed mobile access is configured to include an indication into the accept message which interface mode a core network supports, wherein the interface mode is either using an Iu interface between a radio access network for unlicensed mobile access and the core network, or an Gb interface between the radio access network for unlicensed mobile access and the core network;
the mobile terminal is configured to select the interface mode;
the mobile terminal is configured to send a second request message to the network controller for unlicensed mobile access, wherein the second request message is configured to request a connection based on radio resources for unlicensed mobile access; and
the mobile terminal is configured to include another indication into the second request message, wherein the interface mode that has been selected is indicated.

14. The system according to claim 13, wherein
the configuration of the mobile terminal includes that the first request message comprises a URR_REGISTER_REQUEST message;
the configuration of the network controller for unlicensed mobile access includes that the accept message comprises a URR_REGISTER_ACCEPT message, wherein support of the interface mode is indicated by a new field for a UMA control channel description parameter or by a completely new parameter; and
the configuration of the mobile terminal includes that the second request message comprises a URR_REQUEST message, wherein selection of the interface mode is indicated by a new parameter.

15. A network controller for unlicensed mobile access configured to be operated in an unlicensed mobile access network and comprising both an Iu interface and a Gb interface to a core network, wherein the network controller for unlicensed mobile access is operably connected with a mobile terminal, and
configured to receive and process a request message from the mobile terminal, wherein the request message is configured to request a registration of radio resources for unlicensed mobile access, and to include an indication which interface mode the mobile terminal supports, wherein the interface mode is either using the Iu interface or the Gb interface;
configured to select the interface mode;
configured to send an accept message to the mobile terminal, wherein the accept message is configured to indicate an acceptance of the registration of radio resources for unlicensed mobile access; and
configured to include another indication into the accept message by the network controller for unlicensed mobile access, wherein the interface mode that has been selected is indicated.

16. The network controller for unlicensed mobile access according to claim 15, further configured to base selection on capabilities of the core network.

17. The network controller for unlicensed mobile access according to claim 15, wherein the configuration includes that the accept message comprises a URR_REGISTER_ACCEPT message, wherein selection of the interface mode is indicated by a new field for a UMA control channel description parameter or by a completely new parameter.

18. The network controller for unlicensed mobile access according to claim 15, further configured to send a second update message to the mobile terminal upon receiving a first update message from the mobile terminal requesting a change of the interface mode.

19. The network controller for unlicensed mobile access according to claim 18, wherein the configuration includes that the second update message comprises a URR_REGISTER_UPDATE_DOWNLINK message.

20. A network controller for unlicensed mobile access configured to be operated in an unlicensed mobile access network, the network controller comprising:
both an Iu interface and a Gb interface to a core network, wherein the network controller for unlicensed mobile access is operably connected with a mobile terminal, and
configured to receive and process a first request message from the mobile terminal, wherein the first request message is configured to request a registration of radio resources for unlicensed mobile access;
configured to send an accept message to the mobile terminal, wherein the accept message is configured to indicate an acceptance of the registration of radio resources for unlicensed mobile access;
configured to include an indication into the accept message which interface mode the core network supports, wherein the interface mode is either using the Iu interface or the Gb interface; and
configured to receive and process a second request message from the mobile terminal, wherein the second request message is configured to request a connection based on radio resources for unlicensed mobile access, and to include another indication that the interface mode has been selected by the mobile terminal.

21. The network controller for unlicensed mobile access according to claim 20, wherein the configuration includes that the accept message comprises a URR_REGISTER_ACCEPT message, wherein support of the interface mode is indicated by a new field for a UMA control channel description parameter or by a completely new parameter.

22. A mobile terminal configured for optimized unlicensed mobile access to a core network over an unlicensed mobile access network, wherein the mobile terminal is operably connected with a network controller for unlicensed mobile access, and configured to send a request message to the network controller for unlicensed mobile access, wherein the request message is configured to request a registration of radio resources for unlicensed mobile access;

configured to include an indication into the request message which interface mode the mobile terminal supports, wherein the interface mode is either using an Iu interface between a radio access network for unlicensed mobile access and the core network, or an Gb interface between the radio access network for unlicensed mobile access and the core network; and configured to receive and process an accept message, wherein the accept message is configured to indicate an acceptance of the registration of radio resources for unlicensed mobile access, and to include another indication that the interface mode has been selected by the network controller for unlicensed mobile access.

23. The mobile terminal according to claim 22, wherein the configuration includes that the request message comprises a URR_REGISTER_REQUEST message, wherein support of the interface mode is indicated by a new value for a UMA classmark parameter.

24. The mobile terminal according to claim 22, further configured to send a first update message to the network controller for unlicensed mobile access requesting a change of the interface mode.

25. The mobile terminal according to claim 24, wherein the configuration includes that the first update message comprises a URR_REGISTER_UPDATE_UPLINK message.

26. A mobile terminal configured for optimized unlicensed mobile access to a core network over an unlicensed mobile access network, wherein the mobile terminal is operably connected with a network controller for unlicensed mobile access, and configured to send a first request message to the network controller for unlicensed mobile access, wherein the first request message is configured to request a registration of radio resources for unlicensed mobile access;

configured to receive and process an accept message from the network controller for unlicensed mobile access, wherein the accept message is configured to indicate an acceptance of the registration of radio resources for unlicensed mobile access, and to include an indication which interface mode the core network supports, wherein the interface mode is either using an Iu interface between a radio access network for unlicensed mobile access and the core network, or an Gb interface between the radio access network for unlicensed mobile access and the core network;

configured to select the interface mode;

configured to send a second request message to the network controller for unlicensed mobile access, wherein the second request message is configured to request a connection based on radio resources for unlicensed mobile access; and configured to include another indication into the second request message, wherein the interface mode that has been selected is indicated.

27. The mobile terminal according to claim 26, wherein the configuration includes that the first request message comprises a URR_REGISTER_REQUEST message; and that the second request message comprises a URR_REQUEST message, wherein selection of the interface mode is indicated by a new parameter.

28. The mobile terminal according to claim 22, which is configured to operate in a first mode for global system for mobile communications (GSM) EDGE radio access, in a second mode for universal mobile telecommunication system (UMTS) terrestrial radio access, or in a third mode for unlicensed mobile access.

29. A method of selecting an interface for accessing a core network over an unlicensed mobile access network, wherein the method uses a mobile terminal and a network controller for unlicensed mobile access, and the network controller for unlicensed mobile access comprises both an Iu interface and a Gb interface with the core network, the method comprising:

detecting capabilities of a mobile terminal to support an access over the Iu interface or the Gb interface;

detecting capabilities of a core network to support access over the Iu interface or the Gb interface; and selecting the Iu interface or the Gb interface for access to the core network.

* * * * *